US009836656B2

(12) United States Patent
Langenberg

(10) Patent No.: US 9,836,656 B2
(45) Date of Patent: Dec. 5, 2017

(54) DEVICE FOR THE EXPANDED REPRESENTATION OF A SURROUNDING REGION OF A VEHICLE

(71) Applicant: Robert Bosch GmbH, Stuttgart (DE)

(72) Inventor: Markus Langenberg, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 214 days.

(21) Appl. No.: 14/653,469

(22) PCT Filed: Nov. 29, 2013

(86) PCT No.: PCT/EP2013/075064
§ 371 (c)(1),
(2) Date: Jun. 18, 2015

(87) PCT Pub. No.: WO2014/095304
PCT Pub. Date: Jun. 26, 2014

(65) Prior Publication Data
US 2015/0324650 A1 Nov. 12, 2015

(30) Foreign Application Priority Data
Dec. 18, 2012 (DE) .................. 10 2012 223 588

(51) Int. Cl.
B60R 1/00 (2006.01)
B60R 1/02 (2006.01)
G06K 9/00 (2006.01)
G08G 1/16 (2006.01)
H04N 5/232 (2006.01)
(Continued)

(52) U.S. Cl.
CPC ............ G06K 9/00798 (2013.01); B60R 1/00 (2013.01); B60R 1/02 (2013.01); B60R 1/025 (2013.01); G08G 1/0969 (2013.01); G08G 1/167 (2013.01); H04N 5/23293 (2013.01); H04N 5/265 (2013.01)

(58) Field of Classification Search
None
See application file for complete search history.

(56) References Cited

U.S. PATENT DOCUMENTS

2006/0164228 A1 7/2006 Tseng
2010/0253594 A1* 10/2010 Szczerba ............... G01S 13/723
345/7

(Continued)

FOREIGN PATENT DOCUMENTS

DE 102009020300 11/2010
DE 102009045471 6/2011
WO WO2006/037402 4/2006

OTHER PUBLICATIONS

International Search Report for PCT/EP2013/075064, dated Feb. 18, 2014.

Primary Examiner — Reza Aghevli
(74) Attorney, Agent, or Firm — Norton Rose Fulbright US LLP; Gerard Messina

(57) ABSTRACT

A device is provided for the expanded representation of a surrounding region of a vehicle, the device having an imaging component for the visual representation of the surrounding region. Information from a road model is additionally able to be superimposed on the visual representation of the surrounding region.

8 Claims, 2 Drawing Sheets

(51) Int. Cl.
*H04N 5/265* (2006.01)
*G08G 1/0969* (2006.01)

(56) References Cited

U.S. PATENT DOCUMENTS

| | | | | |
|---|---|---|---|---|
| 2010/0253597 A1* | 10/2010 | Seder | ................ | B60R 1/00 |
| | | | | 345/7 |
| 2010/0253598 A1* | 10/2010 | Szczerba | ............. | G01S 13/723 |
| | | | | 345/7 |
| 2010/0253602 A1* | 10/2010 | Szczerba | ............. | G01S 13/723 |
| | | | | 345/8 |
| 2010/0253918 A1* | 10/2010 | Seder | ............. | G01S 13/723 |
| | | | | 353/13 |
| 2010/0289632 A1* | 11/2010 | Seder | ............. | G01S 13/723 |
| | | | | 340/436 |
| 2010/0315215 A1* | 12/2010 | Yuda | ............. | H04N 5/2259 |
| | | | | 340/435 |
| 2011/0175752 A1* | 7/2011 | Augst | ................ | B60R 1/00 |
| | | | | 340/905 |
| 2012/0224060 A1* | 9/2012 | Gurevich | ............. | B60R 1/00 |
| | | | | 348/148 |
| 2013/0033493 A1* | 2/2013 | Kiyota | ............. | B60R 1/00 |
| | | | | 345/420 |
| 2013/0033494 A1* | 2/2013 | Kiyota | ............. | B60R 1/00 |
| | | | | 345/420 |
| 2014/0022390 A1* | 1/2014 | Blank | ............. | B60R 1/12 |
| | | | | 348/148 |

* cited by examiner

DEVICE FOR THE EXPANDED REPRESENTATION OF A SURROUNDING REGION OF A VEHICLE

FIELD OF THE INVENTION

The present invention is based on a device for representing a surrounding region of a vehicle, the device including an imaging component for the visual representation of the surrounding region.

BACKGROUND INFORMATION

In highway travel, the driver must keep an eye on the traffic following the car as well. Series-produced vehicles currently use rear-view mirrors (on the inside and outside of the vehicle) for this purpose.

Rear-view cameras are furthermore employed in increasing numbers for assistance in parking maneuvers. In the US, such cameras have even become mandatory for new vehicles in the meantime. However, the rear-view camera is presently activated only when the reverse gear is engaged.

The option of replacing the conventional outside mirrors with a combination of camera and display also is a topic of discussion at trade fairs and in studies. Not only is this meant to decrease the aerodynamic drag of the vehicle, but it additionally also offers a platform for further innovations.

Also still in the exploratory stage is the use of augmented reality representations. Here, the real image or a video image of a real scene is supplemented by artificial objects in order to supply the driver with additional information in a contact-analogous manner.

To monitor the lateral control of the vehicle, driver assistants which sense the road markings and output a warning signal if these markings are crossed have been introduced on the market. To do so, the distance from the left and right road markings is sensed on a permanent basis.

The printed publication German Published Patent Application No. 10 2009 020 300 A1 describes a method for representing an automatically detected surrounding region of a vehicle. A virtual road plane is generated for this purpose, which includes road delimitations sensed by an object detection device. Furthermore, the virtual road plane may include additionally detected objects such as people located on the road. The virtual road plane can ultimately be output to the driver, for instance with the aid of a head-up display.

The printed publication German Published Patent Application No. 10 2009 045 471 A1 describes a method for the display of information. It is stated that information to be superposed in a visual region of the driver can be projected within an interior or exterior mirror, for example. Augmented reality displays are possible as well. A head position of the driver is taken into account in all cases according to this printed publication, so that parallax shifting between the superimposed information and a viewing direction of the driver can be compensated.

SUMMARY

The object of the present invention is to assist the driver in assessing driving situations, in a manner that goes beyond the visual display of the real environment. To provide the position of vehicles located in the rear region of the own vehicle if the own vehicle is located on a multi-lane road during darkness.

The present invention is based on a device for displaying a surrounding region of a vehicle, which includes an imaging component for the visual representation of the surrounding region. The core of the invention is that information from a road model is able to be superimposed on the visual representation of the surrounding region in addition. This advantageously makes it possible, especially in darkness or under unfavorable visual conditions, to see the poorly visible road course more easily. In an advantageous manner, the position of other road users on or along the road is therefore able to be estimated in a more optimal manner.

According to one advantageous development of the present invention, the information from the road model includes positions of road markings. The position of other road users is then advantageously able to be allocated to the individual traffic lanes. This is especially advantageous in the case of oncoming traffic or when evaluating the traffic approaching from behind.

According to one advantageous development of the present invention, the device includes a sensor for detecting a first position of road markings, and the first position of road markings may then be used for ascertaining a second position of road markings in the vicinity of the vehicle; this second position of road markings is able to be superimposed on the visual representation of the surrounding region. This advantageously makes it possible to produce an accurate road model which includes road markings in an uncomplicated manner, or it is also possible to accurately determine the position of the vehicle relative to the road model. In a particularly advantageous manner the sensor is formed by an especially already provided lane-keeping assistant.

According to one especially advantageous development of the present invention, the information from the road model includes positions of road markings of a multi-lane road. In particular in the case of roads featuring multiple lanes, the estimation of the precise position of other road users is difficult yet important. When assessing the traffic approaching from the rear, the allocation to a particular traffic lane is particularly advantageous, so that a more optimal assessment can be made as to whether the traffic approaching from behind is closer to or already in the process of overtaking on a passing lane.

According to one advantageous development of the present invention, the device is developed for the expanded representation of a rear surrounding region of the vehicle. This advantageously allows a better display of the surrounding region in back of the vehicle that is difficult to assess, so that the traffic in the rear is able to be evaluated in a more optimal manner.

According to one advantageous development of the present invention, the imaging component is a mirror, especially a rear-view mirror. The rear-view mirror is advantageously added as a supplement in order to create the device according to the invention, so that the rear surrounding region of the vehicle is able to be displayed in a more meaningful manner via the road model with the aid of additionally superimposed information (augmented reality).

This has the special advantage that the mirror is partially transmitting and equipped with a rear side display for the expanded representation. This advantageously makes it possible to supplement the mirror image of the actual, rear surrounding region with information pertaining to the road course, especially together with road markings, in an uncomplicated manner. The representational means required for this purpose, such as projectors or displays, may be situated on the rear side of the mirror, where they are also protected from environmental influences.

According to another advantageous development of the present invention, the imaging component is a camera provided with a display. A combination of camera and display is advantageously able to be supplemented with additional information more easily than a mirror, because in contrast to a mirror, the screen content of the display is independent of the position of the viewer.

In one especially advantageous development of the present invention, the traffic lane in the front region of the vehicle is acquired with the aid of sensors of a lane-keeping assistant, and a road model for the rear region of the vehicle is calculated on this basis. This road model is then displayed to the driver by being superimposed on a rear-view mirror of the vehicle, or it is superimposed on an image of a rear-view camera. In the event that the road model is superimposed in a rear-view mirror of the vehicle, both the mirror orientation and the head position of the driver are advantageously known, so that perspective distortions are able to be compensated. However, because of the road model, the driver is able to better allocate traffic in the rear, of which the driver in most instances sees only the headlights when it is dark, to a particular traffic lane of the multi-lane road.

DETAILED DESCRIPTION

Figure 1:
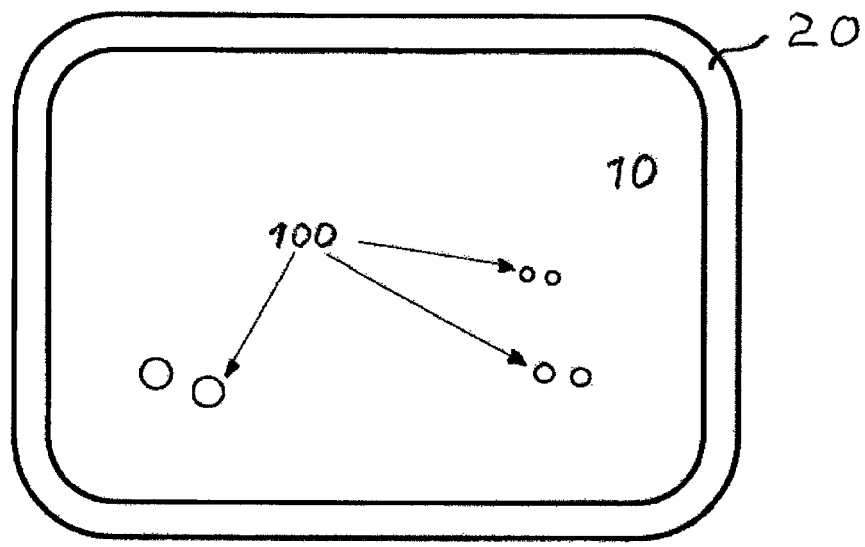
FIG. 1 by way of example depicts the display of an outside mirror at night in the related art.

FIG. 1 depicts the display of an outside mirror at night in the related art by way of example. Shown is an imaging component 20, which visually represents a surrounding region 10. In this case, imaging component 20 is a rear-view mirror in the form of an exterior mirror, and surrounding region 10 is the rear surrounding region of a vehicle, which is displayed in a mirrored view. In this exemplary embodiment the visual representation includes actual image information 100, such as pairs of headlights of trailing vehicles.

The rear-view mirror, for example, is employed in the situation outlined in the following text. If the driver intends to change lanes on the superhighway or some other multi-lane road, the driver checks by glancing at the interior and/or exterior mirror as well as a glance over the shoulder whether the lane is unoccupied. During the day, with good visibility, this task is quite easy. With poor visibility, however, especially at night, this is not always able to be assessed as easily. Only the front headlights of an approaching vehicle are then visible in the rear-view mirror. However, due to insufficient illumination, it is often no longer possible to determine on which lane the approaching vehicle is traveling. One pertinent example is the following situation. On a three-lane superhighway, the own vehicle is traveling in the right-hand lane. The driver wishes to switch to the center lane. Via the exterior mirror the driver notices a rapidly approaching vehicle behind him. However, because of the darkness, it is impossible to determine whether the vehicle is traveling in the center lane or in the left lane. In the latter case, the lane switch would pose no problems, but this could not be said for the former case.

The present invention is able to contribute to a correct assessment of the depicted situation in that information about the course of a traffic lane is added to the visual representation, for instance by the positionally correct superimpositioning of symbolic road markings.

Figure 2:
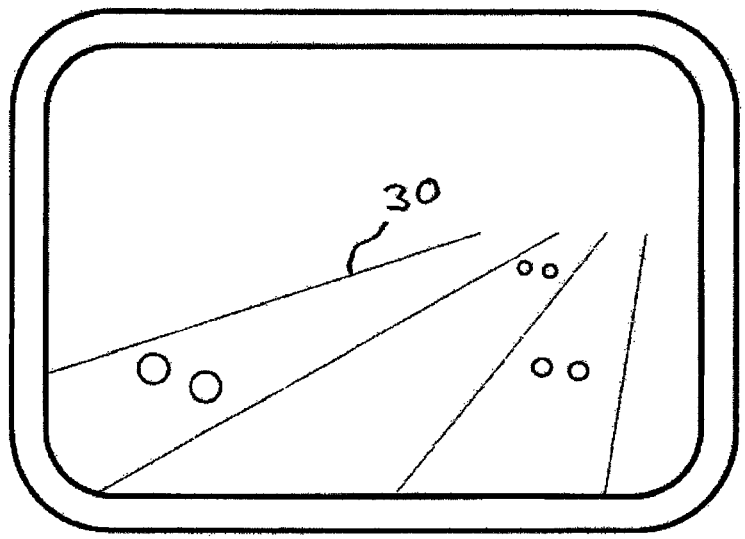
FIG. 2 shows a device according to the present invention for the expanded display of a surrounding region of a vehicle.

FIG. 2 shows a device according to the present invention for the expanded display of a surrounding region of a vehicle. In contrast to FIG. 2, information 30 from a road model, in the form of road markings, is additionally superimposed on the visual representation of surrounding region 10. With the aid of the superimposed supplementary information, it becomes immediately obvious to the viewer of the mirror which vehicle is trailing in which lane at which particular relative distance. The driving situation is able to be analyzed in a safer manner, in particular as far as possible passing maneuvers are concerned.

A road model is used for the positionally correct superimpositioning of the road markings. In one exemplary embodiment this road model is created by the device according to the present invention itself, with the aid of a sensor, such as of the lane-keeping assistant, for instance. To do so, the traffic lane in the front region of the vehicle is sensed with the aid of the measuring sensors of the lane-keeping assistant, and a road model for the rear region of the vehicle is calculated therefrom. This road model is then shown to the driver by being superimposed in a rear-view mirror of the vehicle. In one alternative specific embodiment, the road model is superimposed on the image of a rear-view camera. If the road model is to be superimposed in a rear-view mirror of the vehicle, both the mirror alignment and the head position of the driver must be known in order to compensate for perspective distortions. However, the road model allows the driver a better allocation of traffic in back, of which the driver often sees only the headlights when it is dark, to a particular traffic lane of the multi-lane road.

As a result, in the illustrated exemplary embodiments the present invention provides a reconstruction and a display of rear road markings in the medium that is used for the view towards the rear.

Various media posing different technical challenges may be used for visualizing the reconstructed road markings:

The most obvious but technically also most challenging realization is based on an expansion of the real mirrors by an augmented-reality projection unit. For this purpose a (laser) projector or display is installed behind the mirror, which shines through the mirror (similar to modern displays in taxis). The image the driver sees in the mirror thus is the real mirror image as well as the additional elements that shine through the mirror and are superimposed on the real mirror image. The real mirror image visible to the driver depends solely on the position of the mirror and the driver's own head position. The inclination of the mirror is easily detectable by simple sensors. The head position of the driver must be detected as well. A video camera may be used for this task. If the alignment of the mirror and the head position of the driver are known, the viewing direction through the mirror, and thus the projection of the road in the mirror, is able to be calculated. The reconstructed road markings can therefore be placed in the mirror image in a correct manner.

Much easier is the realization if a combination of video camera and display is employed. In this case, the head position of the driver has no effect, and only the position and viewing direction of the camera must be taken into account. These parameters are acquirable without any problems. Given a suitable orientation, the (possibly already existing) rear-view camera may be used as camera. However, an additional camera on the rear or on the side of the vehicle may be utilized as well. The central display, the freely programmable instrument cluster or a new display may be employed for the display. In the event that the exterior mirrors are replaced by a camera-display combination in the future, they constitute the ideal candidates for the inventive display.

The correct representation of the reconstructed road markings additionally requires the offset with respect to the own lane, which is supplied by the already available lane-keeping assistant. When the front headlights are switched on, the optical detection works at night as well. The correct display of the rear road markings requires that they be shifted by the offset in relation to the own lane.

The distance between two individual road markings is assumed to be constant. That is to say, the distance between two lane markings can be determined from the road marking of the own traffic lane from above. The actual back projection of the lane courses then is able to be obtained in two manners:

For one, it is possible to utilize the own driving history. With the aid of the own speed, the steering angle, and the current distance from the road marking, the lane course in the rear can be recorded, reconstructed and displayed.

As an alternative or in addition, the information concerning the road course can be retrieved from the navigation. This is advantageous insofar as it works even immediately after entering a superhighway, i.e., when the region visible in the rear has actually not been traveled. To be mentioned as a disadvantage is that the map accuracy of current map material will most likely not suffice. A combination of both methods is consequently to be favored.

Figure 3:
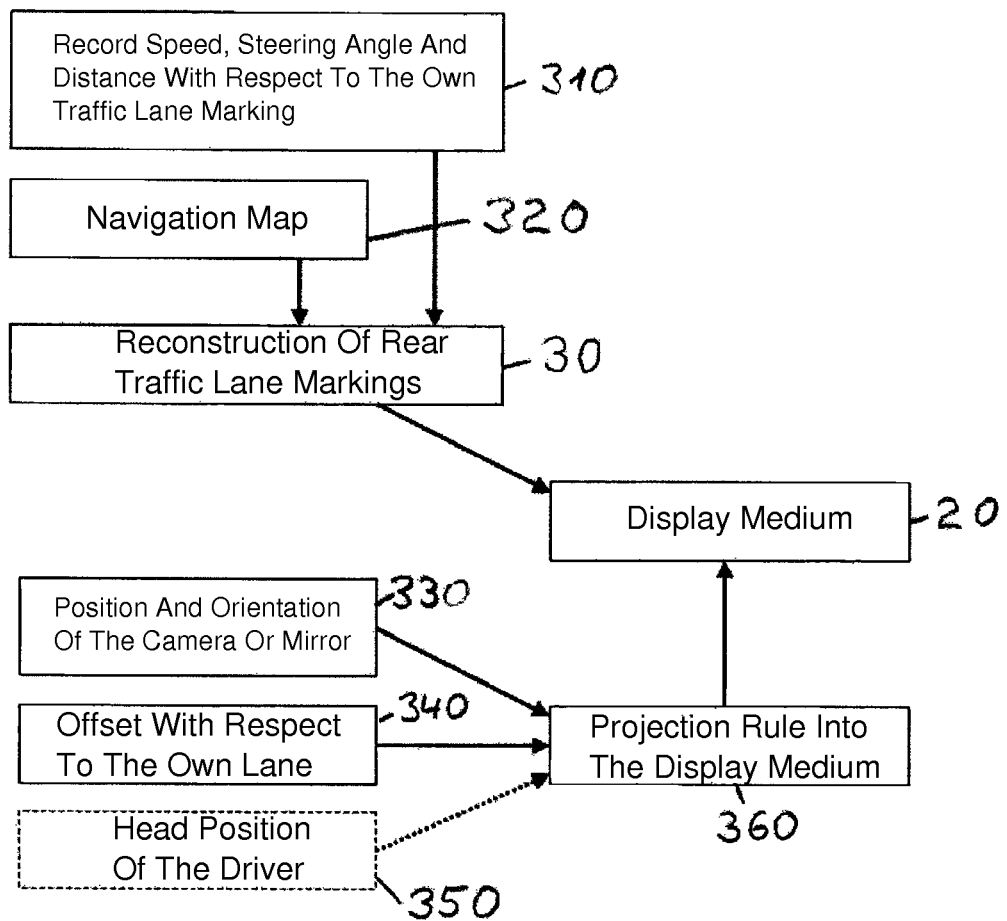
FIG. 3 schematically illustrates a flow of information for the expanded display of a surrounding region of a vehicle according to the present invention, augmented by information of a road model.

FIG. 3 schematically shows a flow of information for the expanded display of a surrounding region of a vehicle, supplemented by information from a road model according to the present invention. Movement data 310 of the vehicle, such as the recorded speed, the steering angle and the distance with respect to the own lane marking, or also a navigation map 320 are used for information 30 about the road model, in particular for reconstructing road markings in the rear. These road markings are superimposed on the display medium, i.e., imaging component 20. The position and alignment 330 of the camera or the mirror, offset 340 with respect to the own lane, as well as head position 350 of the driver as viewer, in the case of a mirror, are processed in order to form a projection rule 360 and likewise forwarded to the display medium.

The overall system, made up of the reconstruction of the lane courses, as well as the correct positioning in the display medium, thus allows a rapid detection of the position of vehicles of the traffic in the rear.

However, the present invention is not restricted to the display of rear road markings. It is also possible to superimpose other additional information of the road model, such as information pertaining to the state of the road, dangerous sections, different ways of marking rapidly approaching vehicles or vehicles that are falling back, etc.

TRANSLATION OF FIG. 3

310 Recorded speed, steering angle and distance with respect to the own traffic lane marking

320 Navigation map
30 Reconstruction of rear traffic lane markings
20 Display medium
330 Position and orientation of the camera or mirror
340 Offset with respect to the own lane
350 Head position of the driver
360 Projection rule into the display medium

What is claimed is:

1. A device for an expanded display of a rear surrounding region of a vehicle, comprising:
   an imaging component including one of a rear-view mirror and a camera having a display, the imaging component providing an actual view of the rear surrounding region, wherein information from a road model is superimposable on the actual view of the rear surrounding region, wherein the information superimposed on the actual view of the rear surrounding image includes road-lane markings of a multi-lane road on which the vehicle is traveling.

2. The device as recited in claim 1, further comprising:
   a sensor for detecting a first position of the road-lane markings, wherein the road model includes a second position of the road-lane markings in the surrounding region of the vehicle that is ascertainable from the first position of the road-lane markings, and wherein the information superimposed on the actual view of the rear surrounding image includes the second position of the road-lane markings.

3. The device as recited in claim 1, wherein the device is developed for an expanded representation of the rear surrounding region of the vehicle.

4. The device as recited in claim 3, wherein the rear-view mirror includes a first area that provides a mirrored view of the rear surrounding region and a second area that is provided with a rear-side display for the expanded representation.

5. The device as recited in claim 2, wherein the sensor is part of a lane-keeping assistant system.

6. The device as recited in claim 1, wherein in superimposing the information on the rear-view mirror, a position of a head of a driver of the vehicle and an orientation of the rear-view mirror are taken into account in order to compensate for a perspective distortion.

7. The device as recited in claim 2, wherein the first position of the road-lane markings is located in a front region of the vehicle, and wherein the second position of the road-lane markings are located in the rear surrounding region.

8. The device as recited in claim 1, wherein the information including the road-lane markings that is superimposed on the imaging component is reconstructed at least on the basis of at least one of a speed of the vehicle, a steering angle of the vehicle, and a distance of the vehicle to a road-lane marking in which the vehicle is located.

* * * * *